United States Patent Office 3,564,599
Patented Feb. 16, 1971

3,564,599
PROCESS FOR THE PREPARATION OF POLY-
DODECALACTAM WITH HIGH MOLECULAR
WEIGHT
Siegfried Schaaf and Wolfgang Griehl, Chur, Grison,
Switzerland, assignors to Inventa A.G. für Forschung
und Patentverwertung, Zurich, Switzerland
No Drawing. Filed Jan. 23, 1964, Ser. No. 339,601
Claims priority, application Switzerland, Jan. 29, 1963,
1,047/63
Int. Cl. C08g 20/10
U.S. Cl. 260—78          5 Claims The present invention relates to the preparation of a polyamide which is capable of after-polymerization in an inert gaseous atmosphere at temperatures below its melting point, by polymerization of ω-dodecalactam. The invention is characterized by the heating of ω-dodecalactam at temperatures of 300–330° C. in the presence of a phosphoric acid.

While it is known that by hydrolytic polymerization of 7- and 8-membered lactams in the presence of known catalysts or viscosity stabilizers and small quantities of water, high-molecular polycaprolactam or polyenantholactam may be obtained at temperatures of 200–300° C., in the higher lactam homologs e.g. ω-undecalactam and ω-dodecalactam, no substantial polymerization can be carried out under the above-mentioned conditions in view of the higher ring stability against hydrolysis. When ω-dodecalactam is heated at the conventional polymerization temperature of 260° C. in the presence of small qauntities of water or even with addition of small quantities of an acid, more than 50% ω-dodecalactam remain unpolymerized even after 30 hours of polymerization.

It is known from French Pat. 1,261,286 to carry out the polymerization of ω-dodecalactam at temperatures from 315 to 320° C. in the presence of catalytic amounts of aliphatic mono- or dicarboxylic acids. However, this will only yield polydodecalactam of medium molecular weight, which cannot be after-polymerized by heating in the atmosphere of an inert gas at temperatures below its melting point. It is further known to subject to polymerization ω-dodecalactam with addition of a small amount of ω-aminododecanoic acid or hexamethylenediamino adipate. This, however, has the same shortcomings as has the use of aliphatic dicarboxylic acids.

It has now been found that in contradistinction to the above-mentioned processes, ω-dodecalactam can be polymerized to a polyamide of very high molecular weight at temperatuers above 300° C., preferably at 300–330° C. in the presence of a phosphoric acid. The so obtained polyamide 12 can be made without difficulties into bristles, foils, rods, molded pieces and tubes by extrusion.

The time of polymerization varies according to the desired degree of polymerization of polydodecalactam from one-half hour to two hours. The relative viscosity of the obtained polydodecalactam is from 1.90 to 2.5; it is measured in an 0.5% solution of m-cresol at 20° C.

When, however, ω-dodecalactam is heated for a considerable time in the presence of an aliphatic dicarboxylic acid, e.g. sebacic acid, the polydodecalactam formed shows a relative viscosity of not more than 1.5 (measured in m-cresol as 0.5% solution at 20° C.).

Polydodecalactam obtained by polymerization of ω-dodecalactam in the presence of a phosphoric acid, may be after-polymerized in a current of nitrogen at a temperature immediately below the melting temperature of the polymer, i.e. below 180° C.; the degree of polymerization can be increased as desired, that is to say even to the point where the polymer loses its solubility in m-cresol.

Phosphoric acids useful as catalysts are, for instance, orthophosphoric acid, metaphosphoric acid, pyrophosphoric acid and other phosphoric acids stable up to 320° C., derived from trivalent or pentavalent phosphorus.

The amount of phosphoric acid may be e.g. 0.05 to 1.0% calculated on the ω-dodecalactam; the preferred amount is 0.1 to 0.3.

In the following, the invention will be illustrated by a number of examples.

EXAMPLE 1

200 grams dodecalactam (melting point 150–151° C.) recrystallized from acetic ester, are melted with 0.4 gram cristalline orthophosphoric acid in a cylindrical glass vessel and heated to 315° C. Purified nitrogen is made to pass as a protective gas first through the melt, and after 15 minutes reaction time over the surface of the melt. Polymerization sets in after a short while and the melt becomes highly viscous. After one hour, polymerization is discontinued, and after the polymer has cooled down, it is comminuted.

The nylon 12 granulate shows a relative viscosity of 1.96 (0.5% in m-cresol at 20° C.) and has a melting point of 181–182° C.

When the optimum quantity of sebacic acid is used as catalyst, polymerization of the same grade of ω-dodecalactam will result in a polyamide with the relative viscosity of only 1.35 (0.5% in m-cresol at 20° C.).

50 grams of nylon 12 granulate made in accordance with example 1, are treated in a cylindrical glass vessel below the melting point, i.e. at 175° C. in a nitrogen current of 2 liters per min. Specimens are taken after 5.8 hours and 10 hours, and tested. There is no change in the content of the extract (methanol). The increase in molecular weight may be seen from the rise of relative viscosity, measured against an 0.5% solution in m-cresol at 20° C.

| Time in hours: | Relative viscosity |
| --- | --- |
| 0 | 1.96 |
| 5 | 2.50 |
| 8 | 2.60 |
| 10 | insoluble |

Polydodecalactam of medium molecular weight made with the use of sebacic acid as catalyst, does not show any change in relative viscosity under the same conditions of after-condensation.

EXAMPLE 2

100 grams ω-dodecalactam are heated with 0.4 gram metaphosphoric acid in a nitrogen atmosphere to 325° C. The viscosity of the melt rises slowly and after two hours polymerization a polymer having the relative viscosity of 2.1 (0.5% in m-cresol at 20° C.) is obtained.

EXAMPLE 3

60 grams ω-dodecalactam are heated in a closed cylindrical glass vessel to 320° C. with addition of 0.15% pyprophosphoric acid. After 40 minutes, the polydodecalactam formed yields an extract of 0.6% in methanol, and has a relative viscosity of 1.92, 0.5% in m-cresol at 20° C.

What is claimed is:

1. A process for preparing a high molecular weight polyamide capable of after-polymerization in an inert gas atmosphere at temperatures below its melting point, which comprises polymerizing ω-dodecalactam by heating under exclusion of water at temperatures above 300° C. in the presence of a phosphoric acid in the amount of 0.05–1% by weight calculated on the ω-dodecalactam.

2. The process according to claim 1, which comprises heating ω-dodecalactam to 300–330° C. in the presence of a phosphoric acid.

3. The process according to claim 1, which comprises heating ω-dodecalactam under exclusion of water in the presence of a member selected from the group consisting of orthophosphoric acid, metaphosphoric acid and pyrophosphoric acid.

4. The process according to claim 1, wherein the amount of said phosphoric acid is 0.1–0.3% by weight calculated on the ω-dodecalactam.

5. A process for producing high molecular weight poly-ω-dodecalactam which comprises heating ω-dodecalactam at a temperature from 300°–330° C. in the presence of a phosphoric acid catalyst selected from the group consisting of orthophosphoric acid, metaphosphoric acid and pyrophosphoric acid.

References Cited

UNITED STATES PATENTS

| | | | |
|---|---|---|---|
| 3,027,356 | 3/1962 | Von Schickh et al. | 260—78L |
| 3,060,173 | 10/1962 | Von Schickh et al. | 260—78L |
| 3,155,637 | 11/1964 | Reichold et al. | 260—78SC |

FOREIGN PATENTS

| | | |
|---|---|---|
| 537,742 | 4/1959 | Canada. |
| 582,517 | 9/1959 | Canada. |
| 705,029 | 3/1954 | Great Britain. |
| 798,659 | 7/1958 | Great Britain. |
| 806,088 | 12/1958 | Great Britain. |

OTHER REFERENCES

Aelion I/EC: Industrial and Engineering Chemistry, vol. 53, Sept.-Dec. 1961, pp. 826–828.

HAROLD D. ANDERSON, Primary Examiner